Figure 3:
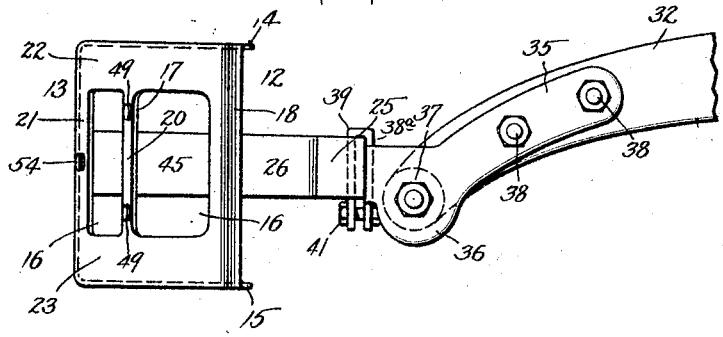

May 19, 1925.
G. F. KOLB
1,538,190
BUMPER FOR MOTOR VEHICLES
Filed May 8, 1923   3 Sheets-Sheet 1
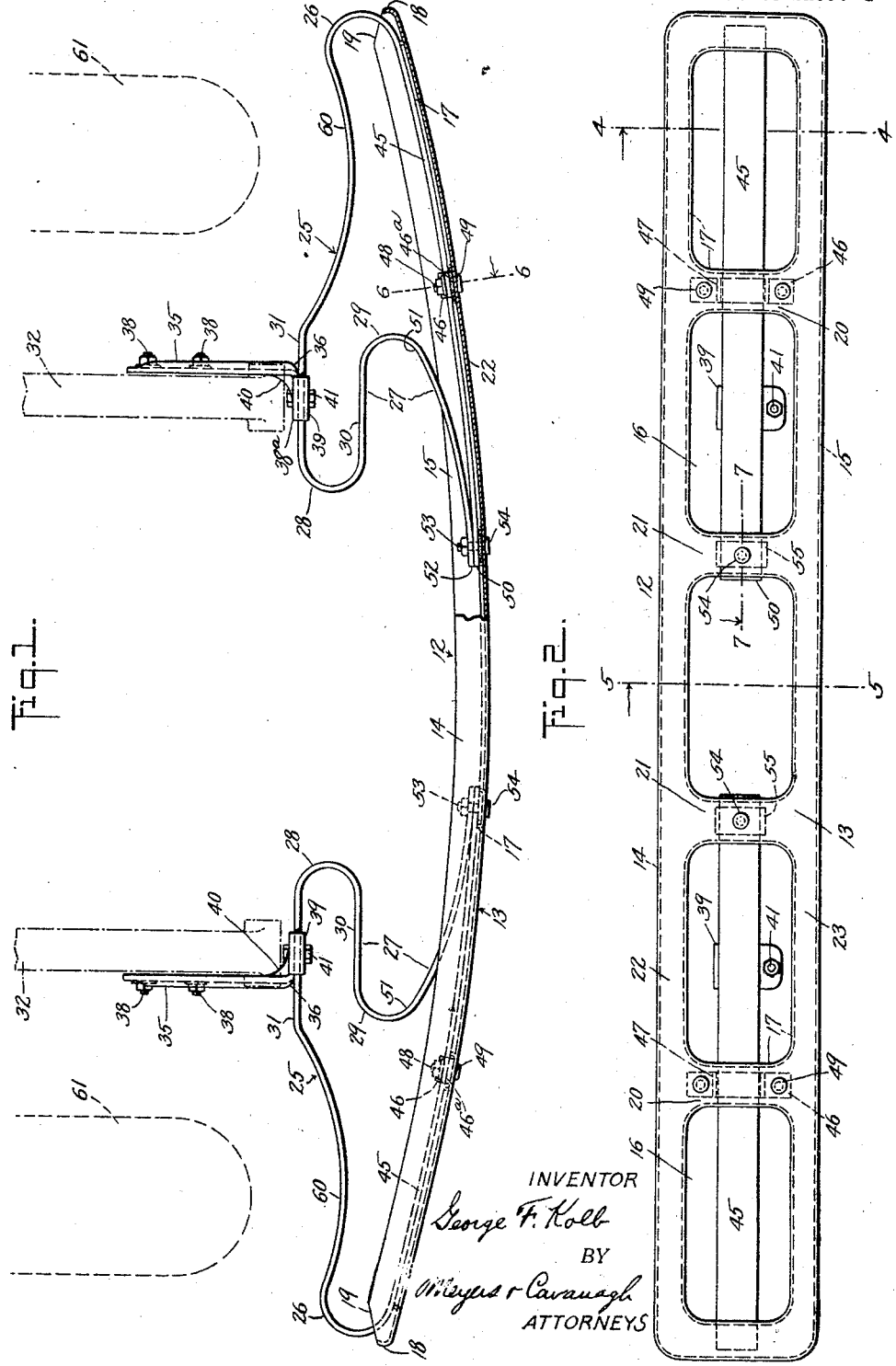
INVENTOR
George F. Kolb
BY
Meyers & Cavanagh
ATTORNEYS May 19, 1925.  1,538,190

G. F. KOLB

BUMPER FOR MOTOR VEHICLES

Filed May 8, 1923  3 Sheets-Sheet 2

INVENTOR
George F. Kolb
BY
Meyers & Cavanagh
ATTORNEYS

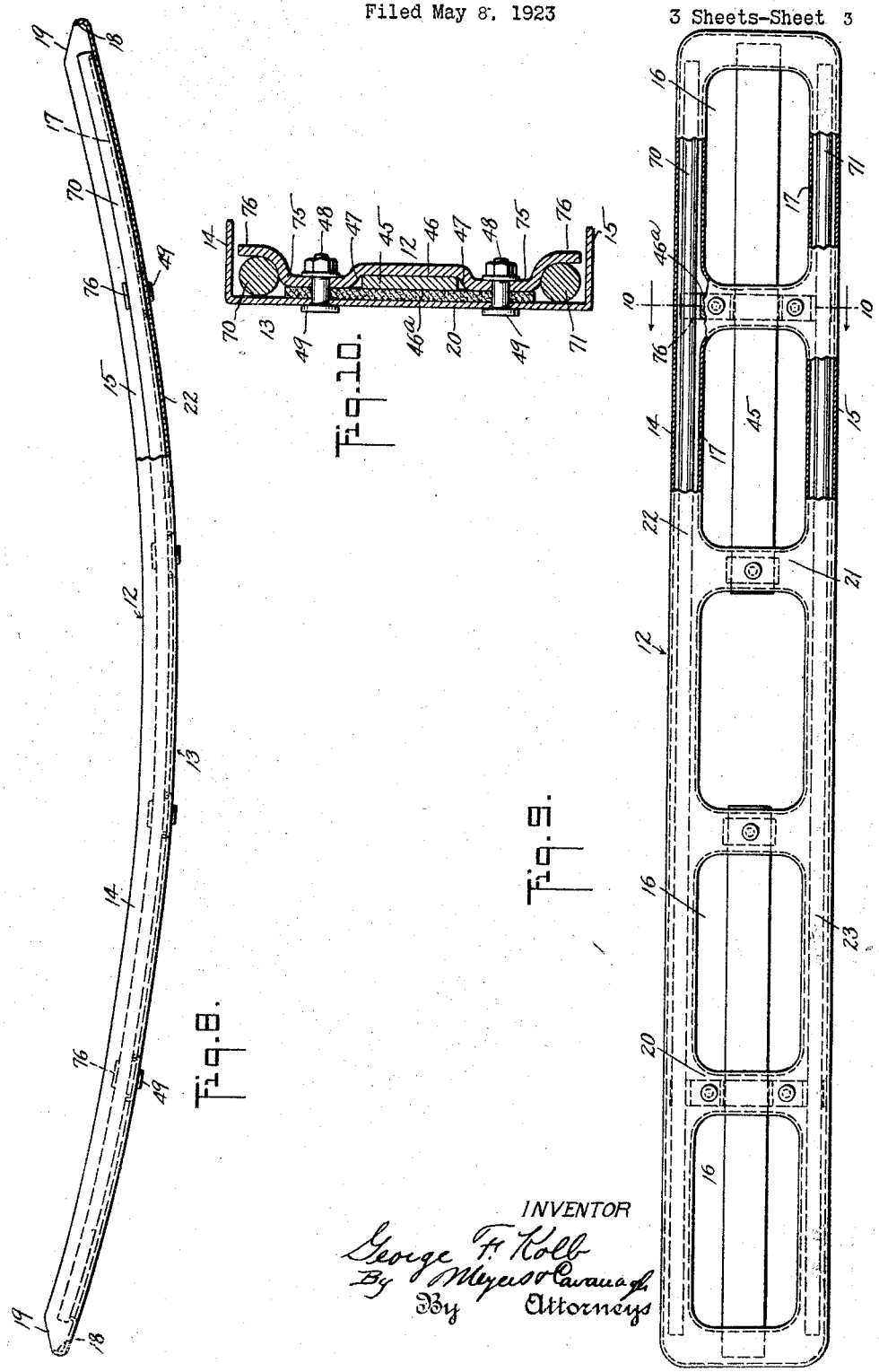

Patented May 19, 1925.

1,538,190

UNITED STATES PATENT OFFICE.

GEORGE F. KOLB, OF FAIRFIELD, CONNECTICUT, ASSIGNOR TO THE BULLARD MACHINE TOOL CO., OF BRIDGEPORT, CONNECTICUT, A CORPORATION OF CONNECTICUT.

BUMPER FOR MOTOR VEHICLES.

Application filed May 8, 1923. Serial No. 637,543.

*To all whom it may concern:*

Be it known that I, GEORGE F. KOLB, citizen of the United States, and resident of Fairfield, in the county of Fairfield and State of Connecticut, have invented certain new and useful Improvements in Bumpers for Motor Vehicles, of which the following is a specification.

My invention relates to motor vehicle bumpers.

A principal object of the invention is to provide a bumper of very light weight, which is at the same time unusually strong and durable, provides ample yielding resistance to impacts, and which may be manufactured at low cost.

Another important object is to provide a bumper which realizes some or all of the foregoing objects, and in which the outer or impact member is of ample width in the vertical direction, to insure proper engagement with the bumpers or other parts of motor vehicles or other obstacles, so that the liability of over-lapping and consequent damage to the vehicle on which the present bumpers are placed, is very largely or entirely eliminated.

Another object is to provide a bumper which has, by reason of its structural features, a distinctive and attractive or decorative appearance.

To attain the foregoing and other objects, I provide an impact member or front bar, which may be of stamped or pressed sheet metal, and which is in general of channel section, with an outer face of ample width in the vertical direction and usually provided with a plurality of openings for the sake of lightness and decorative appearance, and which has upper and lower flanges of ample width to provide substantial stiffness in horizontal planes, and independent spring supports, each of which preferably consists of a single piece of flat spring metal. These springs or supporting members have important novel characteristics sufficiently explained in the detail description.

The construction is such that pressure directed against the impact member near one end thereof, is yieldingly absorbed, mainly by one of the spring supports, and pressure or shocks directed against the impact member near the center thereof, are yieldingly absorbed by both of the spring supports. The impact member may move towards the vehicle several inches, and the resistance afforded to the movement of the impact member increases rapidly in proportion to the amount of its deflection. Very heavy shocks or impacts are thus absorbed without damage to the bumper structure or the vehicle.

The characteristics and advantages of the invention are further sufficiently described in connection with the following detail description of the accompanying drawings, which show certain exemplifying embodiments. After considering these, persons skilled in the art will understand that many variations may be made within the principles of the invention; and I contemplate the employment of any structures that are properly within the scope of the appended claims.

Figure 1 is a plan view of a bumper, embodying the invention in one form, in position on the front end of a motor vehicle.

Figure 4:
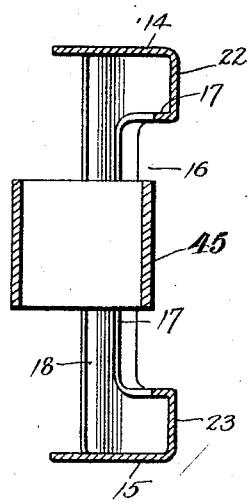
Figure 5:
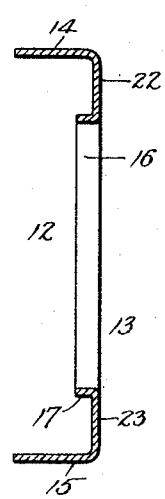
Figure 6:
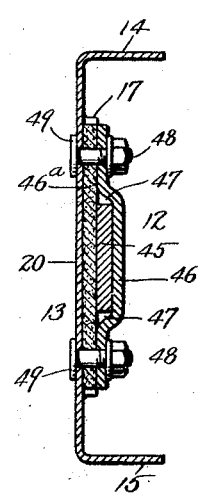
Figure 7:
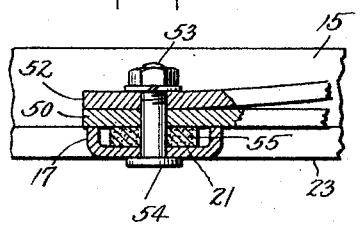

Figure 2 is a front elevation of the same.
Figure 3 is a left end elevation.
Figure 4 is a section at 4—4, Figure 2.
Figure 5 is a section at 5—5, Figure 2.
Figure 6 is a section at 6—6, Figure 1.
Figure 7 is a section at 7—7, Figure 2.
Figure 8 is a top plan of the impact bar and
Figure 9 is a front elevation of the same, illustrating a modification including reinforcements associated with the bumper bar.

Figure 10 is a section at 10—10, Figure 9, showing a connection device adapted for the reinforced structure of Figures 8 and 9.

Referring first to the embodiment of the invention shown in Figures 1 to 7:

The impact member 12, which may otherwise be identified as the bumper bar or impact bar, may vary considerably in detail, but desirably, in one form of the invention, as here shown, it is moderately curved as viewed in plan, Figure 1, the convex curvature being directed forwardly or away from the vehicle. The front face 13 of the impact bar desirably has, as shown, very substantial vertical depth so that when the impact member encounters another bumper, another vehicle, or any other obstruction, it does not easily overlap, or pass above or below the obstruction. In other words, it almost certainly encounters a projecting part of the obstacle and prevents direct contact of the obstacle with the vehicle on which the bumper is placed.

For the sake of lightness and manufacturing economy, the impact member is desirably stamped or pressed from sheet metal, and when properly designed, even though the material is relatively thin, it has ample strength and rigidity to resist permanent bending under even very heavy blows, although it has a certain amount of resiliency which enables it to yield within its limit of elasticity, without taking a permanent set. To strengthen and stiffen the bar, top and bottom webs or flanges 14 and 15 are provided, of substantial width, so that the general cross sectional form of the impact bar, (Figure 4) is that of a channel or C-beam.

Desirably, for the sake of lightness and decorative appearance, the front face or web 13, is formed with a plurality of openings 16, which may vary in shape and arrangement to give different desired decorative effects. In the present specific example, these openings are of generally oblong form with rounded corners, and the metal of the front web 13 is bent or pressed in about each opening to provide a shallow flange 17. These flanges materially stiffen and strengthen the bar without adding appreciably to its weight. The ends of the front web 13 are desirably curved slightly inward or rearward as at 18, Figures 1 and 4, and the top and bottom flanges are desirably cut near their ends on diagonal lines, as at 19, to avoid any sharp outer corners.

In a large number of bumpers now in use, the front or impact members consist of parts of the spring bars. When any considerable vertical surface is provided in bumpers of this class, it is, therefore, necessary to provide two or more vertically superposed spring bars in the front face of the bumper, which materially increases the weight and cost of the structure. It is, moreover, difficult to properly "finish" these spring members, since they cannot be conveniently handled in any economical way in the necessary grinding or polishing operations. My invention does away with these difficulties by providing a one-piece front member or impact bar of ample vertical width, but of thin cross section and light in weight, while approximately or substantially rigid under ordinary conditions, and this single piece of metal can be easily handled in grinding and polishing operations to provide a smooth-finished front face, which may then be nickel-plated to give the desired "finish" to the front of the bumper. It is customary to enamel or paint most or all parts of the bumper structure, except the front face of the impact member proper, and the described impact member construction materially simplifies and cheapens the most expensive finishing operation.

The formation of the bumper bar as described provides a plurality of spaced vertical webs or web-members 20 and 21, each of shallow channel section, connecting the long upper and lower front members or webs 22 and 23, which are of channel section at points intermediate the vertical members 20 and 21, as sufficiently shown in Figure 5, all the parts of the impact bar being, of course, integral, in the preferred mode of construction.

In a great number of bumpers now in use, and especially most of those in which the cushioning effect is provided by strips of flat spring metal, these spring strips are continuous from one side of the vehicle to the other, and they form in themselves the impact member or members, or else the impact member is a piece of flat metal secured to the continuous spring strips and having in itself no considerable strength or resistance to bending strains. The long, continuous spring strips are unduly heavy and expensive and when a separate front plate of the character just described is connected to them the appearance of the structure is frequently awkward and unsightly. To avoid these difficulties and disadvantages, I provide, in connection with the impact member above described, relatively short, light, and inexpensive, independent spring supports, each consisting of a strip of flat spring metal bent to a suitable shape to provide the necessary vertical stiffness for the proper support of the impact member, and the necessary spring resistance to impacts in the horizontal, longitudinal and lateral directions, one of these spring supports being provided for each end portion of the bumper bar.

Specifically, in a preferred construction, as shown in the drawings, each spring support consists of a strip 25 of flat spring steel bent to form a single outer loop 26, and a double or S-shaped inner loop 27, including a loop or bend 28 close to the vehicle frame and another loop or bend 29, relatively near the bumper bar, the bends 28 and 29 usually being connected by a substantially straight portion 30, although the shape of the S-loop 27 may be varied considerably. Adjacent to the bend 28 is a spring portion 31, which is usually straight and arranged in a transverse plane of the vehicle. This single straight portion of the spring support is connected to the vehicle side frame 32 by any suitable bracket. The provision of a single flat member 31 of the spring support at a point adjacent to the vehicle frame, however, permits the use of an improved bracket of a simple and cheap construction, which is moreover, very easily and economically attached to the vehicle.

The bracket, therefore, in a preferred embodiment of the invention, may consist of a piece of pressed or stamped sheet metal including a substantially flat, curved member 35, the curvature of this member conforming to the curvature of the frame member 32, which is in the present instance the front end of a side frame member, or spring horn. When the bumper is to be attached to the rear end of the vehicle, the bracket or the bracket member 35 may be suitably modified for connection to any suitable part of the rear frame structure of the vehicle. In the present example, where the bracket is connected to a front spring horn, the member 35 has an enlarged portion 36, provided with an aperture at 37 to accommodate the spring bolt, which passes through the front end of the spring horn; and the member 35 is secured to the frame member 32 by one, or preferably at least two bolts 38. At its forward end the member 35 is bent angularly to provide a clamp member 38$^a$ and this portion of the bracket sheet is then bent substantially in U-form to provide a clamp member 39. The clamp structure so produced may be stiffened by a web or corner member 40, bent over in the horizontal plane as most clearly shown in Figure 1, and this member may be, in some cases, arranged to rest on the upper surface of the front end of the spring horn and support the bracket, in addition to the support provided by its bolt connections 38, and aperture 37 fitting around the spring bolt.

The single, straight member 31 of the spring support passes between the clamp members 38$^a$ and 39 and is secured by a bolt 41 passing through suitable holes in the lower ends of the clamping members.

Extending inwardly from the outer bend 26 of the spring support is a portion 45 of the spring strip curved in substantial conformity to the curvature of the bumper bar, and lying against the inner surface of the vertical web 13, or more particularly against the inner edges of flanges 17 of the apertures therein. This portion 45 of the spring member may be secured to the bumper bar at one or more points. One point of connection, desirably, is substantially at the vertical web member 20 between two of the end openings 16, that is to say, at a point considerably inward from the end of the bumper bar. The form of connection at this point may vary considerably but in a preferred embodiment, as shown, it includes a strip 46$^a$ of fibre or other suitable more or less compressible material (Figure 6), arranged vertically in the channel member 20 just referred to and serving substantially as a filler to form a supporting surface for the spring member, substantially flush with the edges of the adjacent shallow web members 17. The spring member 45 lies against the inward face of strip 46$^a$ and the inner edges of the adjacent flange members 17, and is secured by a clip 46, usually of pressed sheet metal, having shoulders 47 engaging upper and lower edges of the spring member to prevent vertical displacement of the bumper bar. The clip is secured in position by bolts 48 passing through suitable holes in the ends of clip 46 and in the fibre strip 46$^a$ and bumper member 20, and desirably, the bolt heads 49 are relatively flat and thin and are arranged outwardly, that is, so that these thin bolt heads appear on the front face of the bumper bar, where they are relatively unnoticeable; and they are usually nickel-plated, and then contribute to the highly finished and decorative appearance of the front bumper surface. In this way the spring member 45 is held securely in position against a compressible washer or strip 46$^a$, which prevents loosening of the connection, squeaking or rattling, and also it positively prevents vertical displacement of the impact bar. In some cases the spring member 45 may be cut off at a point just inward from clip 46, but desirably, it continues along the inner face of the bumper bar to a point 50.

The portion 51 of spring support 25 extending forward and inward from bend 29 is formed with a moderate curvature, substantially greater than the curvature of the bumper bar and spring portion 45, the convexity of this curved portion 51 being directed forwardly, and the end of spring member 51 is usually located in line with the other end 50 of spring portion 45. The two spring ends are connected together and to the bumper bar by a bolt 53 (Figure 7) passing through the two spring ends 50 and 52, and through vertical bumper web member 21, these bolts 53 being substantially similar to bolts 48 and arranged in a similar way with their flat heads 54 outward. Desirably, a strip or washer 55 of fibre or other suitable, more or less compressible material, is located in the channel portion of the bumper bar defined by the edges of the adjacent flange members 17, and the flat outer face of spring member 45 rests against the washer, which is compressed by bolt 53, and against the edges of the flanges 17.

The portion 60 of each spring support between its member 31 and the outer bend 26 may be variously formed, but desirably, this portion 60 is curved on a moderate arc with the convexity directed forwardly, to increase the spring effect and also to provide added clearance between the spring support and the vehicle wheel, which is sufficiently indicated in dotted lines at 61.

The described spring supports with their connections to the vehicle frame and to the bumper bar support the latter practically rigidly in the vertical direction, but provide ample flexibility in horizontal planes, longitudinally of the vehicle and also laterally, to a sufficient extent to take up shocks directed against the bumper bar in practically any possible direction. An impact against the bumper bar near one of its ends is taken up mainly by the spring support at that side of the vehicle. The curved portion 60 yields rearwardly while the bend 26 is shortened, and the bends 28 and 29 of the S-loop are also compressed or shortened, while the curved member 51 yields with a progressively increasing resistance. The arrangement of the curved member 51 is such that it is normally spaced away from the adjacent spring member 45 from a point just outward from the point of connection at the bolt 53, and this clearance increases progressively toward the bend 29. When the bar is deflected rearwardly, curved member 51 flattens out, and the point of resistance is thus transferred progressively from the point near the bolts 53 to a point near the bend 29. The spring, adjacent to the member 51, is, in other words, shortened, giving a progressively stiffening spring resistance to the shock. In the case of a very heavy shock the spring support may yield backwardly until the bend 29 is substantially in contact with the bumper bar and also is close to or in contact with the spring member 31. A very considerable range of longitudinal deflection is thus provided for, sufficient to absorb very heavy shocks without injury to the bumper or to the vehicle which carries it.

When the impact is directed toward the center of the bumper bar, both of the spring supports are deflected simultaneously with a progressively increasing resistance, in a manner which is sufficiently clear from the preceding description of the action of one of the springs.

In some cases it is desirable to additionally reinforce the central portion of the bumper bar, and the reinforcement may also be extended substantially to the ends of the bar. Figures 8 to 10 sufficiently illustrate such reinforcements, in one preferred form. The reinforcements in this instance consist of upper and lower round rods 70 and 71 of suitable metal, such as ordinary or spring steel. These rods are located in the channels provided by the upper and lower flanges 14 and 15 and the adjacent shallow flanges 17 at the rear or inner face of the bumper bar. The rods may be welded or otherwise secured in place in various ways. Usually it is not necessary to connect them permanently or integrally to the bumper bar. Desirably, in one preferred construction, they may be held in place by the clips or other fastening devices which secure the bumper bar to the spring support. Figure 10 sufficiently shows one preferred mode of connecting the reinforcing rods in position. In this arrangement, one of the connections such as the clip 46 of Figure 6, is modified by providing end extensions 75 which are curved to engage or substantially fit the rods 70 and 71, and have end portions 76 overlying the rearward sides or faces of the rods, so that the rods are securely held in place when the clips are tightened to hold the spring members 45, or other spring members which may be secured by the clips at the different connection points. The described construction is such that the reinforcing rods may be incorporated in the structure whenever that is desirable, for any particular service, or they may be omitted, without affecting at all, or to any considerable extent, the other features of the structure.

I claim:

1. In a vehicle bumper, an impact bar of pressed sheet metal, of a length sufficient to span the front end of a motor-vehicle, having a vertically wide front web, and having wide rearwardly-directed top and bottom flanges, the front web having spaced apertures, with shallow, rearwardly-directed flanges around their edges, and independent spring supports, each consisting of a single strip of flat spring-metal formed with a single outer bend and an inner S-bend, and with its ends brought together and secured against the inner face of said front web of the impact bar at a point substantially outside the center line of the vehicle, portions of the two spring supports between their single and S-bends being adapted to be secured to brackets or frame members of the vehicle near the opposite sides thereof.

2. A bumper for vehicles comprising, an impact bar of substantially rigid construction, and independent spring supports for the two ends of the impact bar, each spring support consisting of a single strip of flat spring metal bent to form a single outer bend and an inner S-bend with an intermediate member arranged for connection to a bracket on a vehicle frame member near one side of the vehicle, an end portion of the spring strip extending inward from the outer bend and secured to the impact bar at a point considerably inward from the adjacent end thereof, the other end portion of the spring strip extending inwardly from the forward portion of the S-bend and curved convexly in a forward direction and the end of said portion being secured to the impact member at a point somewhat outward from the longitudinal center line of the vehicle.

3. A bumper for vehicles comprising, an impact bar of integral and comparatively rigid construction, and independent spring supports for the two ends of the impact bar, each spring support consisting of a single strip of flat spring metal bent to form a single outer bend and an inner S-bend with a single substantially straight portion between the bends arranged in the vertical transverse plane of the vehicle to which the bumper is attached, said straight portion being adapted for connection to a bracket on a vehicle frame member near one side of the vehicle, an end portion of the spring strip extending inward from the outer bend being secured to the impact member at a point considerably inward from the adjacent end thereof, the other end portion of the spring strip extending inwardly from the forward portion of the S-bent, being curved convexly in a forward direction and the end of said portion being secured to the impact member at a point outward from the longitudinal center line of the vehicle.

4. A bumper for motor vehicles comprising, an impact bar of integral pressed sheet metal in general of channel cross section, having a wide front face or web in the vertical direction and having wide top and bottom flanges rearwardly directed, and individual spring supports, one located near each end of the impact bar, each spring support consisting of a strip of flat spring metal, the two ends of which are connected together and to the vertical web of the impact member at a point outward from the longitudinal center line of the vehicle, one portion of the spring strip adjacent to one of its ends being curved rearwardly to a greater degree than the curvature of the impact member to provide a progressively stiffening spring resistance to impacts, the spring support also having a single outward bend and an inward S-bend, said bends being connected by a substantially straight single stretch of the spring member, arranged in a vertical transverse plane of the vehicle and adapted to be secured to a bracket attached to a vehicle frame member.

5. A bumper for motor vehicles comprising, an impact bar of integral pressed sheet metal in general of channel cross section, having a wide front face or web in the vertical direction and having wide top and bottom flanges rearwardly-directed, and individual spring supports, one located near each end of the impact bar, each spring support consisting of a strip of flat spring metal, one end of which is connected to the vertical web of the impact member at a point outward from the longitudinal center line of the vehicle, a portion of the spring strip adjacent to said end being curved rearwardly to a greater degree than the curvature of the impact member to provide a progressively stiffening spring resistance to impacts, another end portion of the spring strip extending along the inner face of the vertical web of the impact bar and being connected thereto at a point between the aforesaid connection and the end of the bar, the spring support also having a single outward bend and an inward S-bend, said bends being connected by a substantially straight single stretch of the spring member, arranged in a vertical transverse plane of the vehicle and adapted to be secured to a bracket on a vehicle frame member.

6. A bumper for vehicles comprising, an impact bar of substantially rigid construction, and independent spring supports for the two ends of the impact bar each spring support consisting of a single strip of flat spring metal bent to form a single outer bend and an inner S-bend with an intermediate member arranged for connection to a bracket on a vehicle frame member near one side of the vehicle, an end portion of the spring strip extending inward from the outer bend and secured to the impact bar at a point considerably inward from the adjacent end thereof, the other end portion of the spring strip extending inwardly from the forward portion of the S-bend and curved convexly in a forward direction and the end of said portion being secured to the impact member at a point somewhat outward from the longitudinal center line of the vehicle, the devices for securing the spring supports to the impact bar each including a filler strip located between a spring member and the bar, and clamping means securing a spring member against the compressible member and to the impact member.

7. A bumper for vehicles comprising, an impact bar of substantially rigid construction, and independent spring supports for the two ends of the impact bar each spring support consisting of a single strip of flat spring metal bent to form a single outer bend and an inner S-bend with an intermediate member arranged for connection to a bracket on a vehicle frame member near one side of the vehicle, an end portion of the spring strip extending inward from the outer bend and secured to the impact bar at a point considerably inward from the adjacent end thereof, the other end portion of the spring strip extending inwardly from the forward portion of the S-bend and curved convexly in a forward direction and the end of said portion being secured to the impact member at a point somewhat outward from the longitudinal center line of the vehicle, the devices for securing the spring supports to the impact member including filler strips of compressible material located between the spring members and the vertical web of the impact bar, clips including portions securing spring members against the filler strips and to the impact bar, and means for clamping the clips to the bar.

8. A connection for motor vehicle bumper members comprising, an impact bar of generally channel cross section having openings in its vertical web, the adjacent ends of these openings being defined by vertical web portions having parallel sides formed by shallow inturned flanges of the web material, a substantially flat longitudinal spring strip lying parallel to the vertical web of the impact bar, a filler strip lying against one of said vertical web portions between the spring member and said web and also between said shallow web flanges, a clip straddling the spring member and having ends extending above and below said member, and bolts passing through the clip ends and securing the clip, spring member, and filler strip in fixed relation to the web of the impact bar.

9. A connection for motor vehicle bumper members comprising, an impact bar of generally channel cross section having openings in its vertical web, the adjacent ends of these openings being defined by vertical web portions having parallel sides formed by shallow inturned flanges of the web material, a substantially flat longitudinal spring strip lying parallel to the vertical web of the impact bar, a strip of compressible material lying against one of said vertical web portions between the spring member and said web and also between said shallow web flanges, a clip straddling the spring member and having ends extending above and below said member, and bolts passing through the clip ends and securing the clip, spring member and strip of compressible material in fixed relation to the web of the impact bar.

10. A motor vehicle bumper comprising, a bumper bar of pressed sheet metal and of generally channel cross section, and one or more longitudinal reinforcing rods at the rear side of the bumper bar.

11. A motor vehicle bumper comprising, a bumper bar of pressed sheet metal and of generally channel cross section, and one or more longitudinal reinforcing rods at the rear side of the bumper bar, spring supports adapted to be secured to frame members of a vehicle, means for securing the spring supports to the bumper bar, said means including clips adapted to engage said spring supports, said clips having members adapted to engage and retain the reinforcing rods in position at the rear of the bumper bar, and means securing the clips to the bumper bar.

12. A motor vehicle bumper comprising, a bumper bar of pressed sheet metal and of generally channel cross section, and having longitudinal, upper and lower channel formations in its rear face, and reinforcing rods secured in said longitudinal channel formations.

13. A motor vehicle bumper comprising, a bumper bar of pressed sheet metal and of generally channel cross section, and having longitudinal, upper and lower channel formations in its rear face, and reinforcing rods secured in said longitudinal channel formations, spring supports adapted to be secured to frame members of a vehicle, means for securing the spring supports to the bumper bar, said means including clips adapted to engage said spring supports, said clips having members adapted to engage and retain the reinforcing rods in position, and bolts for securing the clips to the bumper bar.

Signed at Bridgeport in the county of Fairfield and State of Connecticut, this 18th day of April A. D. 1923.

GEORGE F. KOLB.

Witnesses:
A. E. NORTH,
E. O. BLANCHARD.